United States Patent Office.

ALFRED AMMELBURG, OF HÖCHST-ON-THE-MAIN, GERMANY, ASSIGNOR TO THE FARBWERKE, VORM. MEISTER, LUCIUS & BRÜNING, OF HÖCHST-ON-THE-MAIN, GERMANY, A CORPORATION.

NEUTRAL COMPOUND OF DIMETHYLAMIDODIMETHYLPHENYLPYRAZOLON AND PROCESS OF MAKING SAME.

SPECIFICATION forming part of Letters Patent No. 686,998, dated November 19, 1901.

Application filed December 21, 1900. Serial No. 40,661. (Specimens.)

*To all whom it may concern:*

Be it known that I, ALFRED AMMELBURG, Ph. D., a citizen of the Empire of Germany, residing at Höchst-on-the-Main, Germany, have invented a Neutral Compound of Dimethylamidodimethylphenylpyrazolon and Process of Making the Same, of which the following is a specification.

I have found that by combining dimethylamidodimethylphenylpyrazolon with camphoric acid a new and useful therapeutic compound may be obtained. The manufacture of this compound is only possible under certain conditions—namely, if mixed solutions of dimethylamidodimethylphenylpyrazolon and camphoric acid be concentrated without access of moisture, light, and heat. If these precautions are neglected, products will be obtained of a more or less yellow color and bad crystallization and which change still more on being kept apparently on account of the decomposition causing the yellow color.

The new compound combines the therapeutic properties of dimethylamidodimethylphenylpyrazolon and camphoric acid, showing, besides the antipyretic action of dimethylamidodimethylphenylpyrazolon, also the antihydrotic action of camphoric acid. Pharmacological and clinical experiments have shown that the combination of dimethylamidodimethylphenylpyrazolon and camphoric acid has quite a different action from what was to be expected. A mere superposition of the action of the components does not take place; but their effect in the new compound is modified, in as much as the antihydrotic action of the camphoric acid is greatly increased, while the toxical action of dimethylamidodimethylphenylpyrazolon is reduced. For instance, the desired antipyretic action is obtained with phthisical people with 0.75 grams of neutral camphorate of dimethylamidodimethylphenylpyrazolon, (corresponding to 0.23 grams of camphoric acid and 0.52 grams of dimethylamidodimethylphenylpyrazolon,) causing the secretion of perspiration to cease at the same time, while with camphoric acid alone to produce the desired effect one-half gram is generally employed, whereas 0.5 gram is considered as the maximum dose of dimethylamidodimethylphenylpyrazolon.

I illustrate my process as follows: Fifteen kilos of dimethylamidodimethylphenylpyrazolon are dissolved in ninety kilos of ether, dried with sodium, to which is added an anhydrous solution of 6.493 kilos of camphoric acid in twenty-five kilos of ether. The solution of camphoric acid and dimethylamidodimethylphenylpyrazolon is condensed at ordinary temperature *in vacuo* without access of light when the dimethylamidodimethylphenylpyrazolon separates in warty aggregates. The neutral camphorate of dimethylamidodimethylphenylpyrazolon thus obtained is a fine white powder having the melting-point 81° to 82° centigrade. The theoretical nitrogen is 12.69 per cent., while the actual yield is 12.78 per cent.

Having now described my invention, what I claim is—

1. The herein-described process of making a neutral compound of camphoric acid and dimethylamidodimethylphenylpyrazolon, which consists in concentrating a mixed anhydrous solution of these two compounds in the dark and at ordinary temperature, substantially as set forth.

2. As a new product, the neutral compound of dimethylamidodimethylphenylpyrazolon with camphoric acid, being a white crystalline powder, readily soluble in water, almost tasteless, and having the melting-point 81° to 82° centigrade, substantially as set forth.

In testimony that I claim the foregoing as my invention I have signed my name in presence of two subscribing witnesses.

ALFRED AMMELBURG.

Witnesses:
ALFRED BRISBOIS,
JEAN GRUND.